US012092189B2

(12) United States Patent
Fukamachi et al.

(10) Patent No.: US 12,092,189 B2
(45) Date of Patent: Sep. 17, 2024

(54) INTERSECTING-AXES TYPE GEAR MECHANISM

(71) Applicant: SUBARU CORPORATION, Tokyo (JP)

(72) Inventors: Shunsuke Fukamachi, Tokyo (JP); Keiichiro Tobisawa, Tokyo (JP); Hideki Mitsuhashi, Tokyo (JP); Shigeki Tanoue, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 52 days.

(21) Appl. No.: 17/823,340

(22) Filed: Aug. 30, 2022

(65) Prior Publication Data

US 2023/0085409 A1   Mar. 16, 2023

(30) Foreign Application Priority Data

Sep. 15, 2021   (JP) ................... 2021-150196

(51) Int. Cl.
*F16H 1/12* (2006.01)
*F16H 1/14* (2006.01)
*F16H 1/18* (2006.01)
*F16H 55/08* (2006.01)
*F16H 55/17* (2006.01)

(52) U.S. Cl.
CPC ............. *F16H 1/125* (2013.01); *F16H 1/145* (2013.01); *F16H 1/18* (2013.01); *F16H 55/0846* (2013.01); *F16H 55/17* (2013.01)

(58) Field of Classification Search
CPC ........ F16H 1/125; F16H 1/18; F16H 55/0846; F16H 55/17; F16H 55/0873; F16H 1/145
See application file for complete search history.

(56) References Cited

U.S. PATENT DOCUMENTS

| 10,295,039 B2 * | 5/2019 | Bittner ................... B23H 9/003 |
| 2007/0125148 A1 * | 6/2007 | Dohmann ................ B21K 1/30 |
| | | 72/352 |
| 2017/0261068 A1 * | 9/2017 | Zhao ....................... B23F 9/082 |

FOREIGN PATENT DOCUMENTS

JP   2007-162745 A   6/2007

* cited by examiner

*Primary Examiner* — Terence Boes
(74) *Attorney, Agent, or Firm* — Smith, Gambrell & Russell, LLP (57) ABSTRACT

An intersecting-axes gear type mechanism includes two gears configured to rotate in mesh with each other. Respective axes of rotation of the two gears being disposed in an intersecting-axes manner, at least one of the gears has teeth each of which includes a tooth trace extending substantially in a radial direction and a radially inner end face. A chamfered portion is formed on a meeting portion where the radially inner end face and a tooth face of the each of the teeth meet, so as to extend over an overall length of the meeting portion. At least an entirety of an area where the chamfered portion and the radially inner end face meet and an entirety of an area where the chamfered portion and the tooth face meet are each composed of a curved surface in overall length.

5 Claims, 6 Drawing Sheets

INTERSECTING-AXES TYPE GEAR MECHANISM

CROSS-REFERENCE TO RELATED APPLICATIONS

The present application claims priority from Japanese Patent Application No. 2021-150196 filed on Sep. 15, 2021, the entire contents of which are hereby incorporated by reference.

BACKGROUND

The disclosure relates to a gear mechanism, and for example, to a gear mechanism in which the axes of rotation of two gears that rotate in mesh with each other are intersecting.

Typically, the intersecting-axes type gear mechanism is used to transmit power while changing the rotation direction. In the field of vehicles, hypoid gears used in the final reduction gears are well known. In the hypoid gears, because the input and output shafts are shifted from each other, the axes of rotation of two gears are located at skew positions. Including these hypoid gears, the gears in which the axes of rotation of two gears are intersecting in a view in a predetermined direction are called intersecting-axes type gear mechanisms. Another example of the intersecting-axes type gear mechanisms is bevel gear mechanisms, in which the axes of rotation of two gears are perpendicular to each other.

A hypoid gear is composed of a pinion gear (small diameter gear) and a ring gear (large diameter gear). Besides good noise-and-vibration performance during meshing rotation and the ability to transmit high torque, hypoid gears have a characteristic in which the mesh point of the gears moves in the tooth trace direction (typically called "sliding of tooth faces"). When focusing on the ring gear included in the hypoid gear having such a characteristic, in a tooth face of the ring gear with the tooth trace extending in a curve substantially in the radial direction, in the mesh point with a tooth of the pinion gear, the mesh point moving as described above, the mesh portion at the radially inner end is subjected to the largest stress.

In Japanese Unexamined Patent Application Publication (JP-A) No. 2007-162745, portions (corners) where tooth faces of teeth of a ring gear and radially inner end faces of the teeth meet are chamfered to avoid the concentration of stress on these corners. These chamfered portions are formed on both drive (driving) side tooth faces and coast (driven) side tooth faces of the teeth of the ring gear and are formed of so-called C-chamfered portions, in which the corners are removed at an angle so as to form flat surfaces.

SUMMARY

An aspect of the disclosure provides an intersecting-axes type gear mechanism including two gears configured to rotate in mesh with each other. Respective axes of rotation of the two gears are disposed in an intersecting-axes manner. At least one of the two gears includes teeth each of which include a tooth trace extending substantially in a radial direction and a radially inner end face. The chamfered portion is formed on a meeting portion. The meeting portion is disposed where the radially inner end face and a tooth face of the each of the teeth meet. The chamfered portion extending over an overall length of the meeting portion. At least an entirety of an area where the chamfered portion and the radially inner end face meet and an entirety of an area where the chamfered portion and the tooth face meet are each composed of a curved surface.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

While there is a demand for increased transmission torque in vehicles these days, decrease in the transmission efficiency in hypoid gears is a problem. This is thought to be due to a fact that, for example, if the lubrication state of a hypoid gear at the tooth face is constant, the greater the transmission torque is, the smaller the thickness of lubricant at the tooth face interface is, leading to increased coefficient of friction at the tooth face interface. For example, as the transmission torque increases, the lubrication regime at the tooth face interface changes from fluid lubrication to mixed lubrication, and to boundary lubrication, in other words, the film thickness decreases, in this order. Because there is almost no lubricant at the tooth face interface in the mixed lubrication regime and the boundary lubrication regime, the coefficient of friction at the tooth face interface is high.

When the hypoid gear is lubricated by immersion, the amount of lubricant supplied to the tooth face interface can be increased by, for example, increasing the amount of lubricant in the gear case accommodating the hypoid gear. However, this method increases the resistance due to stirring and splashing of the lubricant in a bath of lubricant.

It was confirmed that, in the ring gear of the hypoid gear having C-chamfered portions at the corners between the tooth faces and the radially inner end faces, as described in JP-A No. 2007-162745, there is a possibility that the lubricant cannot be sufficiently supplied to the interface with a tooth face of the pinion.

It is desirable to provide an intersecting-axes type gear mechanism in which it is possible to supply a sufficient amount of lubricant to the tooth face interface.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
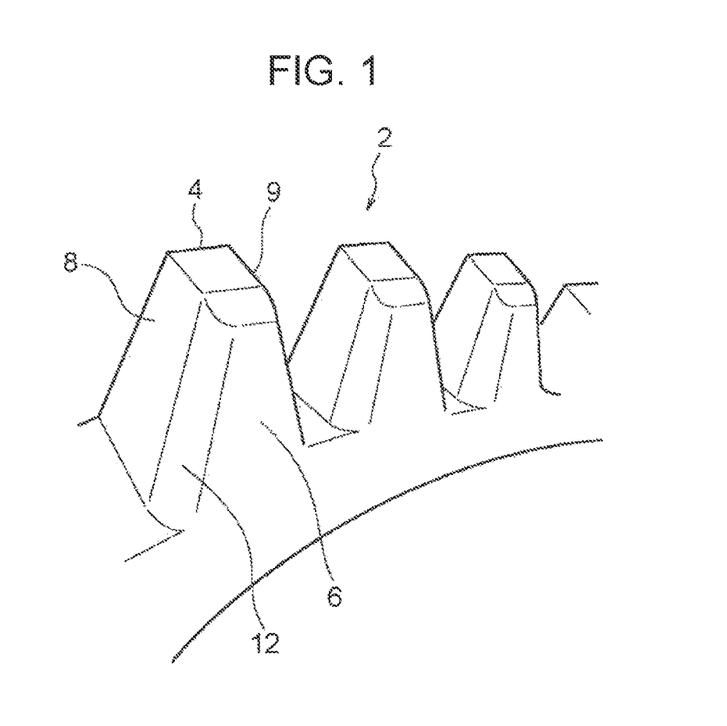
FIG. 1 is a perspective view illustrating an embodiment of a ring gear of a hypoid gear to which an intersecting-axes type gear mechanism of the disclosure is applied.
Figure 10:
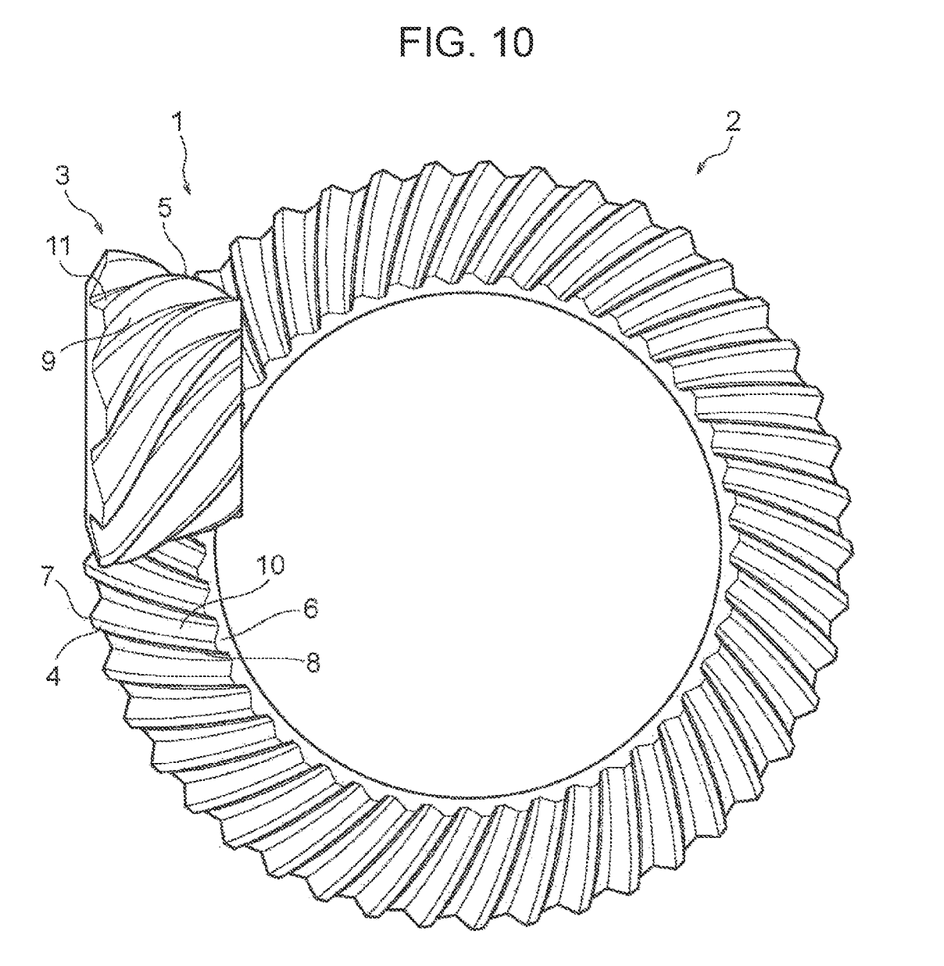
FIG. 10 illustrates an example of the hypoid gear.

FIG. 1 is a perspective view illustrating the embodiment of a ring gear 2 of a hypoid gear 1 to which the intersecting-axes type gear mechanism of the disclosure is applied, and FIG. 10 illustrates an example of the hypoid gear 1. First, the hypoid gear 1 will be briefly described. The hypoid gear 1 is composed of the ring gear (large diameter gear) 2, which has a ring shape as a whole, and a pinion gear (small diameter gear) 3, which has a truncated cone shape as a whole. A shaft member (not illustrated) is integrally coupled to the large diameter side of the truncated-cone-shaped pinion gear 3. Because the axis of rotation of the pinion gear 3 and the axis of rotation of the ring gear 2 are shifted from each other in the vertical direction in FIG. 10, these axes of rotation are located at skew positions. Including the hypoid gear 1, a gear including two gears which have axes of rotation intersecting in a view in a predetermined direction may be called an intersecting-axes type gear mechanism. That is, the intersecting-axes type gear mechanism includes the two gears which have no parallel rotation axes to be disposed in an intersecting-axes manner.

The teeth 4 and 5 formed on the ring gear 2 and the pinion gear 3 of the hypoid gear 1 are so-called spiral teeth. The teeth 4 of the ring gear 2 extend substantially in the radial direction with the tooth trace curved. The teeth 4 have radially inner end faces 6 and radially outer end faces 7. In the teeth 4 and 5, convex tooth faces of the ring gear 2 and concave tooth faces of the pinion gear 3 constitute drive-side (driving-side) tooth faces 8 and 9 of themselves, and concave tooth faces of the ring gear 2 and convex tooth faces of the pinion gear 3 constitute coast-side (driven-side) tooth faces 10 and 11 of themselves. With this tooth face configuration and the shifted axes of rotation, in the hypoid gear 1, the mesh point (mesh line) between tooth faces moves in the tooth trace direction, which is called "sliding of tooth faces". In this example, in a drive-side tooth face (convex tooth face) 8 of the ring gear 2 rotating in mesh with the pinion gear 3, the mesh point moves from the tooth-tip side toward the tooth-root side, from the radially outer side toward the radially inner side. In this embodiment, the axis of rotation of the pinion gear 3 is disposed above the axis of rotation of the ring gear 2. Hence, in immersion lubrication, the amount of lubricant at the mesh point tends to be insufficient due to the pinion gear 3 being located at a high position.

In this embodiment, as illustrated in FIG. 1, chamfered portions 12 are formed on portions where the radially inner end faces 6 and the drive-side tooth faces 8 of the teeth 4 of the ring gear 2 meet, so as to extend over the overall length of the meet portions. The chamfered portions 12 are so-called R-chamfered portions having arc-shaped surfaces. Because the chamfered portions 12 are R-chamfered arc-shaped surfaces, there are no bent portions in the areas of the chamfered portions 12. The "bent portion" means a portion where two surfaces meet at an angle, forming a clear boundary (ridgeline) therebetween. Furthermore, in this embodiment, because the chamfered portions 12 are R-chamfered portions, there are no bent portions in the areas where the chamfered portions 12 and the radially inner end faces 6 of the teeth 4 meet or in the areas where the chamfered portions 12 and the drive-side tooth faces 8 of the teeth 4 meet. In other words, the areas where the chamfered portions 12 and the radially inner end faces 6 of the teeth 4 meet and the areas where the chamfered portions 12 and the drive-side tooth faces 8 of the teeth 4 meet are also arc-shaped surfaces.

Figure 2:
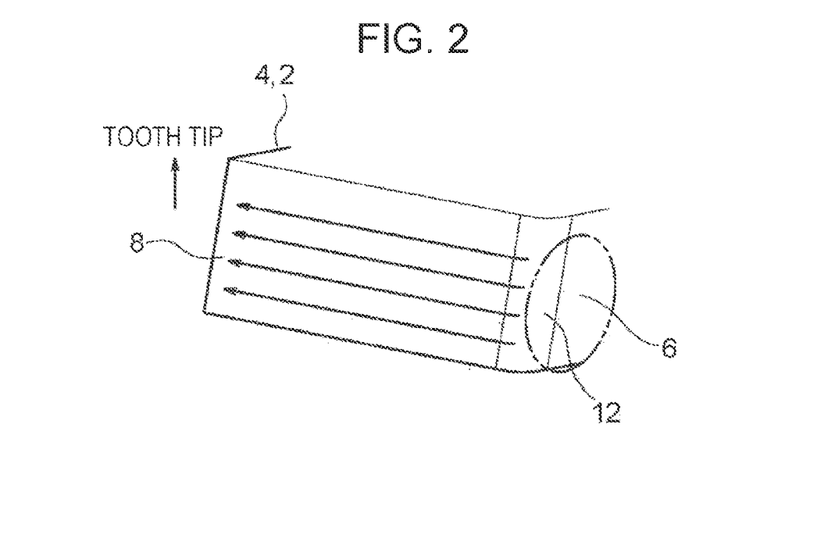
FIG. 2 illustrates the flow of lubricant in the ring gear in FIG. 1.

FIG. 2 schematically illustrates the flow of lubricant on a tooth 4 of the ring gear 2 in FIG. 1. In this embodiment, the flow of lubricant was analyzed with the particle method. As is known, in the particle method, for example, the fluid is regarded as an array of particles, and the accelerations of the particles are calculated by the Navier-Stokes equations, and the velocities of the particles moved with these accelerations are successively updated to obtain the movement, i.e., the flow of the fluid. Note that the particles do not represent a substance such as water droplets, but represent the calculation points, similarly to the lattice points in the lattice approach. One of the benefits of the particle method is that it is effective in tracking a state in which droplets of fluid scatter over a wide area, and the result of analysis is intuitively visualized.

For example, assuming that the hypoid gear 1 in FIG. 10 is immersed in a bath of lubricant in the gear case, there are lubricant reservoirs at the inside portions of the radially inner ends of the teeth 4 of the ring gear 2 that have been moved upward from the bath of lubricant as the gear rotates. FIG. 2 illustrates a lubricant reservoir with a two-dot chain line and the flow of lubricant with arrows. As is clear from FIG. 2, the lubricant in the lubricant reservoir tends to move radially outward due to the centrifugal force (inertial force) caused by the rotation of the ring gear 2. At this time, the lubricant moves to the R-chamfered portion 12 formed on the portion where the radially inner end face 6 and the drive-side tooth face 8 of the tooth 4 meet, and then moves from the chamfered portion 12 to the drive-side tooth face 8. In this flow of lubricant, there is no flow diverging from the tooth face, as in the case described below. Hence, it is possible to supply a sufficient amount of lubricant to the interfaces with the teeth 5 of the pinion gear 3. Furthermore, as in this example, while the mesh point with the tooth 5 of the pinion gear 3 moves from the radially outside to the radially inside, the lubricant flows (is supplied) from the radially inside to the radially outside. Hence, it is possible to continuously supply the lubricant to the interface with the tooth 5 of the pinion gear 3.

Figure 3:
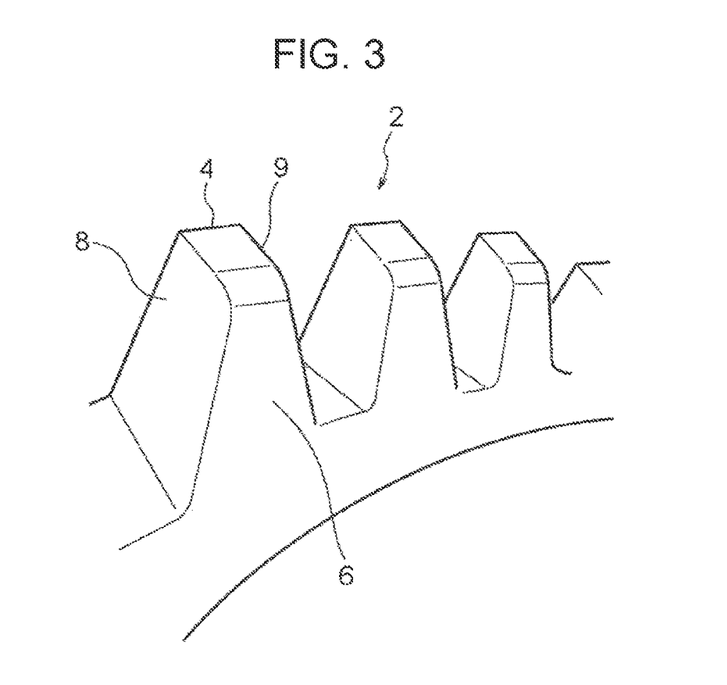
FIG. 3 is a perspective view illustrating an example of a ring gear of a conventional hypoid gear.
Figure 4:
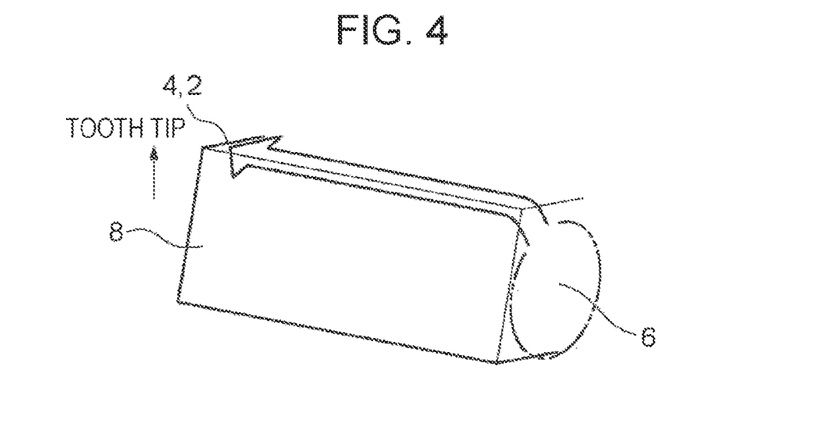
FIG. 4 illustrates the flow of lubricant in the ring gear in FIG. 3.

FIG. 3 is a perspective view of the ring gear 2 of the conventional hypoid gear 1, which has no chamfered portions on the teeth. FIG. 4 illustrates the result of analysis of the flow of lubricant on a tooth of the ring gear 2 with the particle method, in the same way as above. Similarly to the above-described case, the lubricant in the lubricant reservoir on the inside of the radially inner end face 6 of the tooth 4 of the ring gear 2 tends to move radially outward due to the centrifugal force caused by the rotation of the ring gear 2. However, in this example, as illustrated in FIG. 4, the lubricant flows toward the tooth tip along the corner (edge), i.e., the bent portion, where the radially inner end face 6 and the drive-side tooth face 8 of the tooth 4 meet.

Thereafter, the lubricant flows radially outward along the corner (edge), i.e., the bent portion, at the tooth tip of the drive-side tooth face 8. Thus, the amount of lubricant flowing to the drive-side tooth face 8 is small. Accordingly, with the teeth 4 of the conventional ring gear 2, the lubricant is not sufficiently supplied to the interfaces with the teeth 5 of the pinion gear 3.

Figure 5:
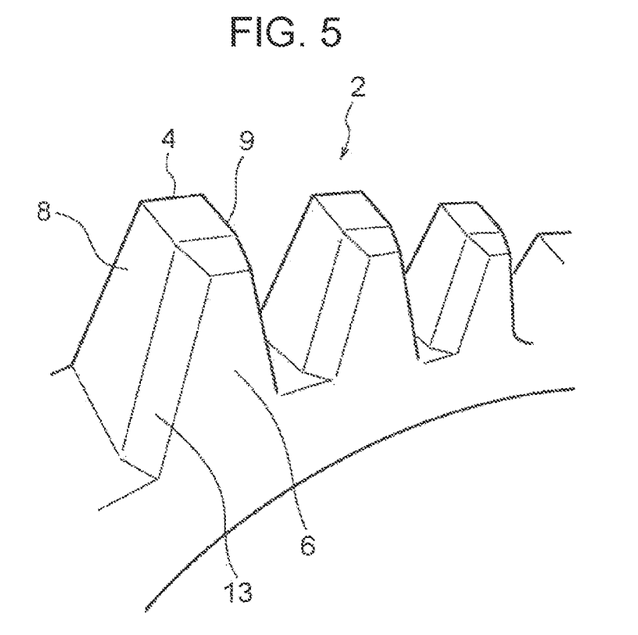
FIG. 5 is a perspective view of a ring gear of a hypoid gear according to a first comparative example of the disclosure.
Figure 6:
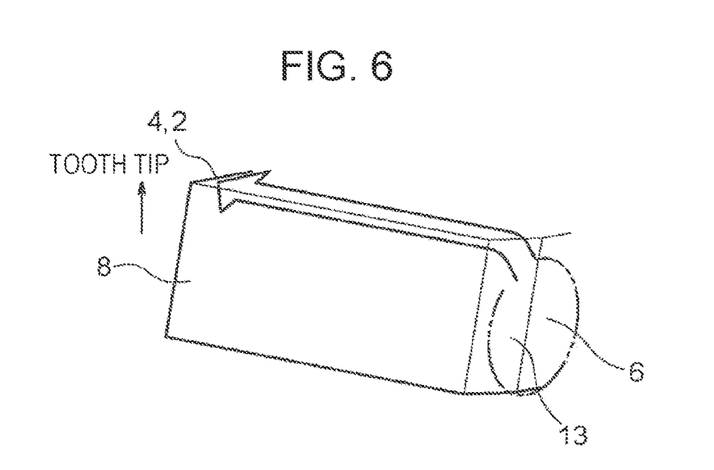
FIG. 6 illustrates the flow of lubricant in the ring gear in FIG. 5.

FIG. 5 is a perspective view of a ring gear 2 of a hypoid gear 1 according to a first comparative example, in which C-chamfered portions 13 are formed on the portions where the radially inner end faces 6 and the drive-side tooth faces 8 of the teeth 4 of the ring gear 2 meet, so as to extend over the overall length of the meet portions (these are the same chamfered portions as in JP-A No. 2007-162745, but formed on the drive-side tooth faces). In the first comparative example, there are bent portions (ridgelines) in the areas where the C-chamfered portions 13 and the radially inner end faces 6 of the teeth 4 meet and in the areas where the chamfered portions 13 and the drive-side tooth faces 8 meet. FIG. 6 illustrates the result of analysis of the flow of lubricant on a tooth 4 of the ring gear 2 with the particle method, in the same way as above.

Similarly to the above-described case, the lubricant in the lubricant reservoir on the inside of the radially inner end face 6 of the tooth 4 of the ring gear 2 tends to move radially outward due to the centrifugal force caused by the rotation of the ring gear 2. However, in this example, as illustrated in FIG. 6, the lubricant flows toward the tooth tip mainly along the bent portion (ridgeline) where the chamfered portion 13 and the radially inner end face 6 of the tooth 4 meet and along the bent portion (ridgeline) where the chamfered portion 13 and the drive-side tooth face 8 meet. Thereafter, the lubricant flows radially outward along the corner (edge), i.e., the bent portion, at the tooth tip of the drive-side tooth face 8. Thus, the amount of lubricant flowing to the drive-side tooth face 8 is small. Accordingly, with the teeth 4 of the ring gear 2 according to the first comparative example, the lubricant is not sufficiently supplied to the interfaces with the teeth 5 of the pinion gear 3.

There is a common feature between the flow of lubricant, illustrated in FIG. 4, on the tooth 4 of the conventional ring gear 2, as illustrated in FIG. 3, and the flow of lubricant, illustrated in FIG. 6, on the tooth 4 of the ring gear 2 having the C-chamfered portion 13 on the drive-side tooth face 8, as illustrated in FIG. 5; that is, there is a boundary (ridgeline) extending in a direction intersecting the direction of the flow of lubricant from the lubricant reservoir in the radially inner end face 6 of the tooth 4 of the ring gear 2 toward the drive-side tooth face 8 due to the centrifugal force caused by the rotation of the gear. Due to this boundary (ridgeline) extending in the direction intersecting the direction of the flow of lubricant, the lubricant flows in a direction away from the tooth face, along the boundary (ridgeline). Hence, in the ring gear 2 having these boundaries (ridgelines) on any of the radially inner end faces 6, the drive-side tooth faces 8, and the chamfered portions 13 of the teeth 4, the lubricant is not sufficiently supplied to the interfaces with the teeth 5 of the pinion gear 3.

Figure 7:
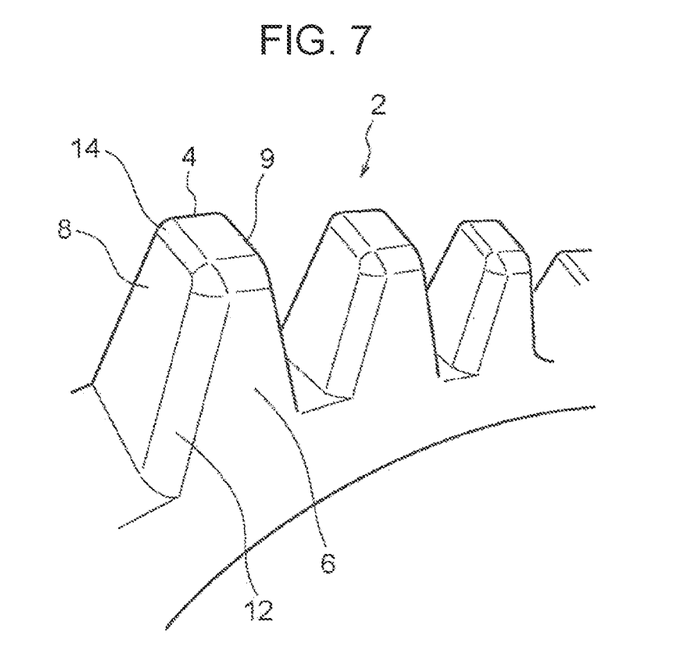
FIG. 7 is a perspective view of a ring gear of a hypoid gear according to a second comparative example of the disclosure.
Figure 8:
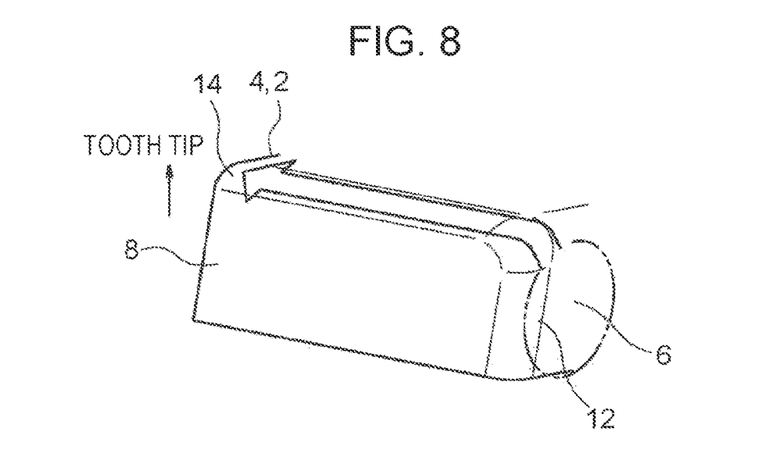
FIG. 8 illustrates the flow of lubricant in the ring gear in FIG. 7.

FIG. 7 is a perspective view of a ring gear 2 of a hypoid gear 1 according to a second comparative example, which has: R-chamfered portions (hereinbelow, first chamfered portions) 12 at the corners where the drive-side tooth faces 8 and the radially inner end faces 6 of the teeth 4 of the ring gear 2 meet, so as to extend over the overall length of the meet portions, as in the gear in FIG. 1; and R-chamfered portions (second chamfered portions) 14 at the tooth-tip corners (edges) of the drive-side tooth faces 8. In the second comparative example, there are no bent portions (ridgelines) in the two chamfered portions 12 and 14, in the areas where the first chamfered portions 12 and the radially inner end faces 6 of the teeth 4 meet, in the areas where the first chamfered portions 12 and the drive-side tooth faces 8 meet, or in the areas where the second chamfered portions 14 and the drive-side tooth faces 8 meet. FIG. 8 illustrates the result of analysis of the flow of lubricant on a tooth 4 of the ring gear 2 with the particle method, in the same way as above. Similarly to the above-described case, the lubricant in the lubricant reservoir on the inside of the radially inner end face 6 of the tooth tends to move radially outward due to the centrifugal force caused by the rotation of the ring gear 2. However, in this example, as illustrated in FIG. 8, the lubricant flows toward the tooth tip from the first chamfered portion 12 and then radially outward along the second chamfered portion 14. Thus, the amount of lubricant flowing toward the drive-side tooth face 8 is small. Accordingly, with the teeth 4 of the ring gear 2 according to the second comparative example, the lubricant is not sufficiently supplied to the interfaces with the teeth 5 of the pinion gear 3.

Figure 9:
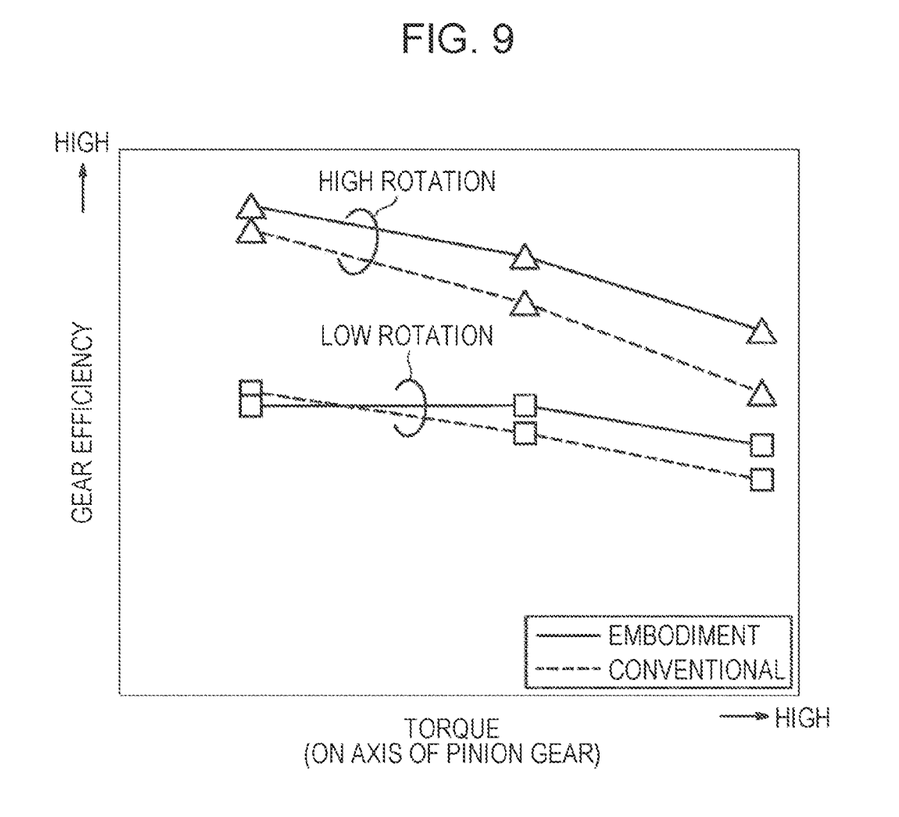
FIG. 9 is an explanatory diagram of the transmission efficiency of the hypoid gear using the ring gear in FIG. 1.

FIG. 9 illustrates the results of measurement of the actual transmission efficiency (i.e., the gear efficiency in FIG. 9) with the hypoid gear 1 using the ring gear 2 in FIG. 1 and with the hypoid gear 1 using the ring gear 2 in FIG. 3 (the pinion gears 3 have the same shape). The torque on the horizontal axis is the torque on the axis of rotation of the pinion gear 3. As described above, as the load (torque) increases, the film thickness between the tooth faces decreases. Furthermore, as the number of revolutions increases, the lubricant is more likely to scatter, and consequently, the film thickness decreases. As is clear from FIG. 9, the hypoid gear 1 using the ring gear 2 according to the embodiment has higher transmission efficiency than the hypoid gear 1 using the conventional ring gear 2, especially in a high rotation, high load state. This is thought to be because the above-described supply of the lubricant is sufficiently performed to the tooth face interfaces, reducing the coefficient of friction between the meshing tooth faces. Hence, the hypoid gear 1 using the ring gear 2 according to the embodiment can be suitably applied to high-rotation, high-load vehicles produced these days.

As described above, in the ring gear 2 of the hypoid gear 1, which is an intersecting-axes type gear mechanism in which the axes of rotation of two gears are located at skew positions, the lubricant in the lubricant reservoir located on the inside of the radially inner end face 6 of the tooth 4 with the tooth trace extending in the radial direction tends to flow from the chamfered portion 12 toward the drive-side tooth face 8 due to the centrifugal force caused by the rotation of the gear. With the intersecting-axes type gear mechanism according to the embodiment, at least the areas where the chamfered portions 12 and the radially inner end faces 6 meet and the areas where the chamfered portions 12 and the drive-side tooth faces 8 meet are formed of curved surfaces, and there is no boundary (ridgeline) intersecting the flow direction of lubricant in the area where the lubricant flows. Hence, the lubricant flowing from the chamfered portion 12 toward the drive-side tooth face 8 does not flow in a direction diverging from the tooth face. As a result, a sufficient amount of lubricant is supplied to the tooth face that meshes with the tooth 5 of the pinion gear 3, thus increasing the transmission efficiency.

Furthermore, because the chamfered portions 12 are so-called R-chamfered portions, which are formed of curved surfaces, there are no bent portions in the areas of the chamfered portions 12 themselves, or in the areas where the chamfered portions 12 and the radially inner end faces 6 or the drive-side tooth faces 8 of the teeth 4 meet. Thus, it is possible to ensure a sufficient supply of lubricant to the tooth face interfaces with a relatively simple configuration.

Furthermore, in the ring gear 2 of the hypoid gear 1, in which the mesh point with the pinion gear 3 moves in the tooth trace direction, because the lubricant is supplied from the radially inside to the radially outside on the drive-side tooth face 8, in which the mesh point moves from the radially outside to the radially inside for example, it is possible to continuously supply the lubricant to the interface with the tooth 5 of the pinion gear 3.

Although the intersecting-axes gear type mechanism according to the embodiment has been described above, the disclosure is not limited to the configuration described in the above-described embodiment, but may be variously modified within the scope of the disclosure. For example, although the R-chamfered portions 12 having arc-shaped surfaces are formed on the portions where the radially inner end faces 6 and the drive-side tooth faces 8 of the teeth 4 of the ring gear 2 meet in the embodiment, the chamfered portions 12 may have other curved surfaces. Furthermore, the chamfered portions 12 may partially have a planar portion. As described above, when the lubricant on the inside of the radially inner end face 6 of the tooth 4 of the ring gear 2 flows from the chamfered portion 12 toward the drive-side tooth face 8, if there is a boundary (ridgeline) extending in a direction intersecting the flow direction of the lubricant, the amount of lubricant to be supplied to the tooth face decreases. Hence, at least the areas where the chamfered portions 12 and the radially inner end faces 6 of the teeth 4 meet and the areas where the chamfered portions 12 and the drive-side tooth faces 8 meet may be both formed of curved surfaces over the overall lengths thereof.

Furthermore, although the chamfered portions 12 are formed on the portions where the radially inner end faces 6 and the drive-side tooth faces 8 of the teeth 4 of the ring gear 2 of the hypoid gear 1 meet in the embodiment, the chamfered portions 12 may be formed on the coast-side tooth faces. Furthermore, the disclosure may also be applied to, for example, a bevel gear (a straight bevel gear or a spiral bevel gear), as long as the tooth trace of the teeth extends substantially in the radial direction, and the teeth have the radially inner end faces 6.

As described above, with the disclosure, the lubricant located on the inside of the radially inner end face of the tooth with the tooth trace extending in the radial direction flows from the chamfered portion toward the tooth face due to the centrifugal force caused by the rotation of the gear, and the flow is not blocked. Hence, it is possible to supply a sufficient amount of lubricant to the meshing tooth face interface and, thus, to improve the transmission efficiency of the intersecting-axes type gear mechanism.

The invention claimed is:

1. An intersecting-axes type gear mechanism comprising two gears configured to rotate in mesh with each other, respective axes of rotation of the two gears being disposed in an intersecting-axes manner, at least one of the two gears comprising teeth each of which comprise a tooth trace extending substantially in a radial direction and a radially inner end face, wherein
    a chamfered portion is formed on a meeting portion, the meeting portion being disposed where the radially inner end face and a tooth face of the each of the teeth meet, the chamfered portion extending over an overall length of the meeting portion, and
    at least an entirety of an area where the chamfered portion and the radially inner end face meet and an entirety of an area where the chamfered portion and the tooth face meet are each composed of a curved surface, and wherein
    the two gears constitute a hypoid gear comprising a ring gear, and
    the chamfered portion is formed on only a drive-side tooth face of the ring gear among the drive-side tooth face and a coast-side tooth face of the ring gear.

2. The intersecting-axes type gear mechanism according to claim 1, wherein the chamfered portion is composed of a curved surface.

3. An intersecting-axes type gear mechanism comprising two gears configured to rotate in mesh with each other, respective axes of rotation of the two gears being disposed in an intersecting-axes manner, at least one of the two gears comprising teeth each of which comprise a tooth trace extending substantially in a radial direction and a radially inner end face, wherein
    a chamfered portion is formed on a meeting portion, the meeting portion being disposed where the radially inner end face and a tooth face of the each of the teeth meet, the chamfered portion extending over an overall length of the meeting portion, and
    at least an entirety of an area where the chamfered portion and the radially inner end face meet and an entirety of an area where the chamfered portion and the tooth face meet are each composed of a curved surface, and wherein each tooth has a tip surface that defines a ridgeline at an intersection with the tooth face,
    wherein the chamfered portion is composed of a curved surface, and
    wherein
    the two gears constitute a hypoid gear comprising a ring gear, and
    the chamfered portion is formed on only a drive-side tooth face of the ring gear among the drive-side tooth face and a coast-side tooth face of the ring gear.

4. The intersecting-axes type gear mechanism according to claim 3, wherein each tooth has a tip surface that defines a ridgeline at an intersection with the inner end face.

5. An intersecting-axes type gear mechanism comprising two gears configured to rotate in mesh with each other, respective axes of rotation of the two gears being disposed in an intersecting-axes manner, at least one of the two gears comprising teeth each of which comprise a tooth trace extending substantially in a radial direction and a radially inner end face, wherein
    a chamfered portion is formed on a meeting portion, the meeting portion being disposed where the radially inner end face and a tooth face of the each of the teeth meet, the chamfered portion extending over an overall length of the meeting portion, and
    at least an entirety of an area where the chamfered portion and the radially inner end face meet and an entirety of an area where the chamfered portion and the tooth face meet are each composed of a curved surface, and wherein each tooth has a tip surface that defines a ridgeline at an intersection with the inner end face,
    wherein
    the two gears constitute a hypoid gear comprising a ring gear, and
    the chamfered portion is formed on only a drive-side tooth face of the ring gear among the drive-side tooth face and a coast-side tooth face of the ring gear.

* * * * *